(No Model.)
S. E. HENNAGIR.
DETACHABLE HORSESHOE.
No. 548,163. Patented Oct. 15, 1895.
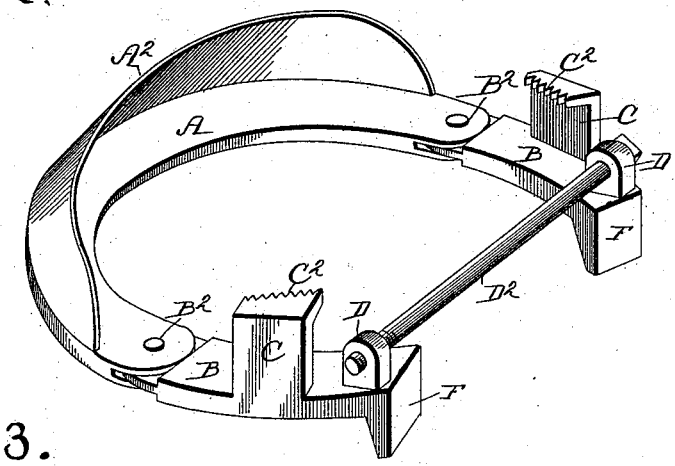
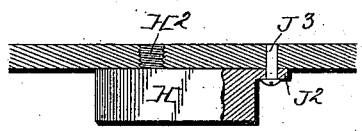
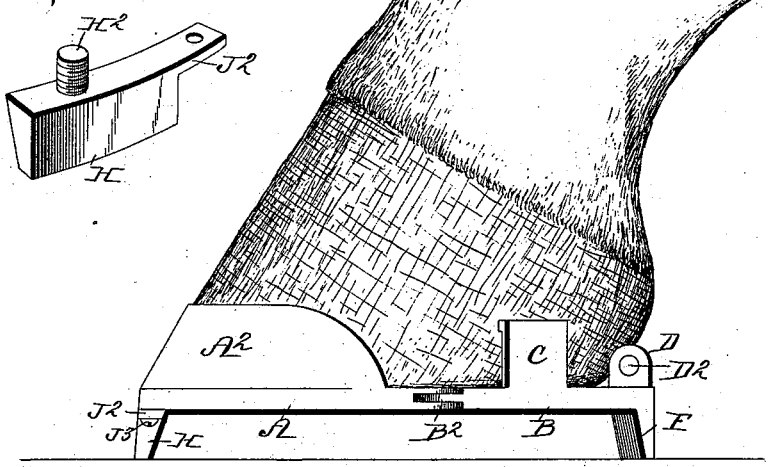

United States Patent Office.

SILES E. HENNAGIR, OF ARDAL, IOWA, ASSIGNOR OF ONE-HALF TO DAVID A. ZIMMERMAN, OF SAME PLACE.

DETACHABLE HORSESHOE.

SPECIFICATION forming part of Letters Patent No. 548,163, dated October 15, 1895.

Application filed March 19, 1895. Serial No. 542,429. (No model.)

*To all whom it may concern:*

Be it known that I, SILES E. HENNAGIR, a citizen of the United States, residing at Ardal, in the county of Butler and State of Iowa, have invented a new and useful Detachable Horseshoe, of which the following is a specification.

The object of this invention is to provide a horseshoe of cheap, simple, and durable construction that may be readily and quickly attached to or removed from a horse's hoof of any ordinary size without the use of nails or other fastening devices that enter the horse's hoof, to provide a shoe that may be applied by persons unskilled in shoeing, and further, to provide a detachable calk that may be quickly and firmly attached or removed.

My invention consists in certain details in the construction, arrangement, and combination of the parts, as hereinafter set forth, pointed out in my claim, and illustrated in the accompanying drawings, in which—

Figure 1 is a perspective view of the shoe detached. Fig. 2 shows a horse's hoof provided with the detachable shoe. Fig. 3 is a sectional view of a part of the shoe, showing the connection of the toe-calk therewith. Fig. 4 is a perspective view of the calk.

Referring to the accompanying drawings, the reference-letter A is used to indicate the body portion of the shoe, shaped to extend around the front of the hoof and having an upwardly-extending flange $A^2$ to overlap the hoof. This part is preferably cast complete in one piece.

B B indicate the rear end portions of the shoe, hinged to the part A at $B^2$ and each having formed integral with its top surface an upright C, with its top inclined inwardly, and serrated at $C^2$, said serrated edge being shaped to fit a horse's hoof. To provide means for drawing these rear end portions of the shoe together, and thus force the part $C^2$ into the hoof, I have provided an integral perforated lug D on each of said ends, one of said perforations being screw-threaded, and a bolt $D^2$, adapted to be passed through one lug and screwed into the other.

It is obvious that the shoe may be placed on a horse's hoof and the rear ends drawn together by a manipulation of the bolt $D^2$ and the shoe be firmly clamped to the hoof.

F F indicate calks formed integral with the rear ends of the shoe.

H indicates the toe-calk, which is of the ordinary general contour. It is adapted to be connected with a shoe by means of a screw-threaded projection $H^2$ at its top, adapted to enter a screw-threaded bore in the bottom of the part A.

$J^2$ indicates a perforated ear formed on one end of the calks to admit a screw $J^3$, that is adapted to enter a bore in the shoe.

To apply the calk, the projection H is screwed into the shoe until the top surface of the calk engages the under surface of the shoe. Then a small straight screw $J^3$ is passed through the perforated ear and screwed into the shoe. This prevents the calk from turning relative to the shoe, and the integral projection on the calk forms a strong and durable fastening for the calk.

Having thus described my invention, what I claim as new therein, and desire to secure by Letters Patent of the United States therefor, is—

An improved detachable horse shoe, comprising a part having an upwardly and rearwardly extending flange, two side pieces hinged to the ends thereof, lugs on said side pieces having inwardly extending serrated edges, perforated ears on said side pieces, and a bolt passed through the ears, substantially as set forth, for the purposes stated.

SILES E. HENNAGIR.

Witnesses:
J. RALPH ORWIG,
THOMAS G. ORWIG.